Patented Nov. 3, 1953

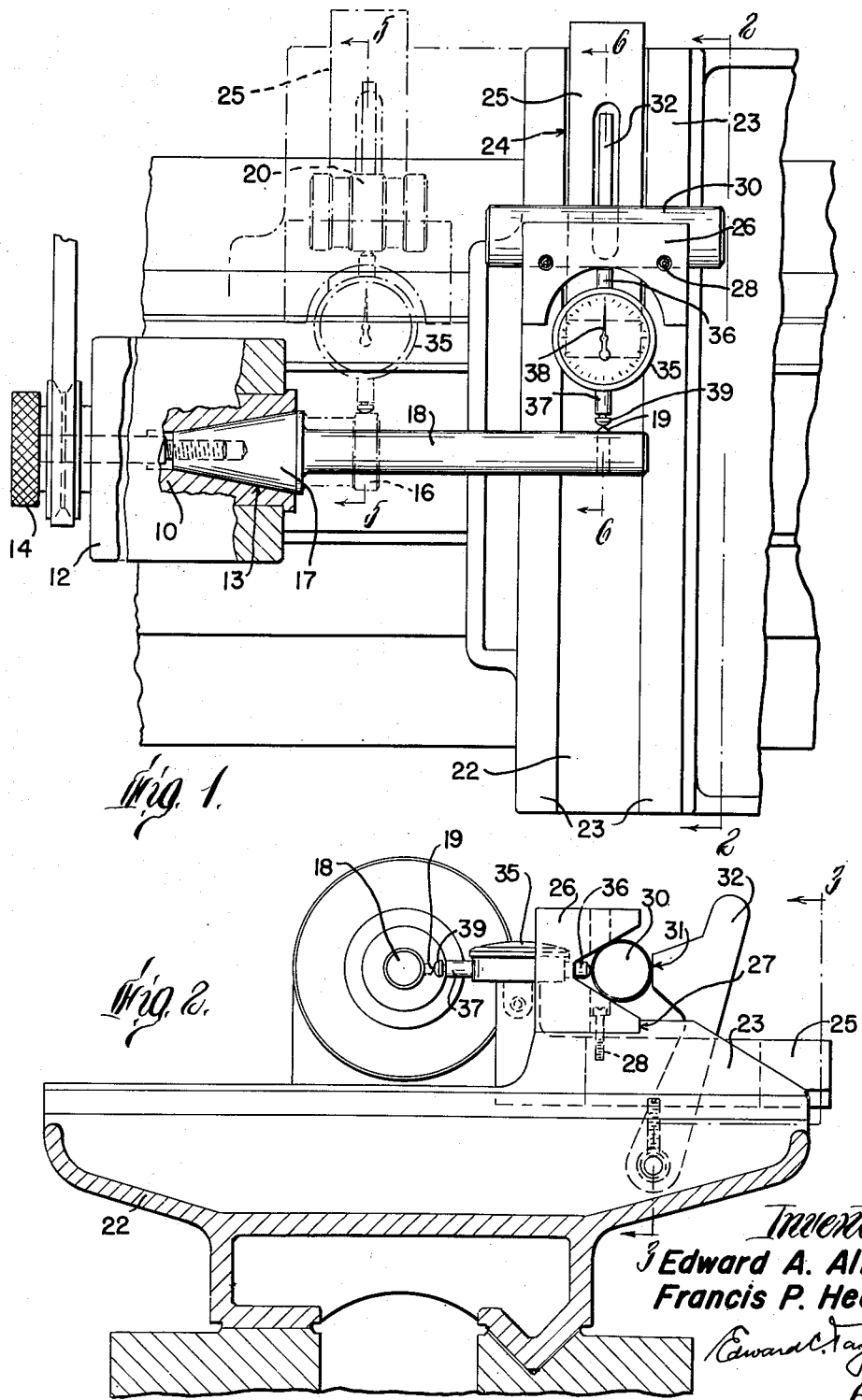

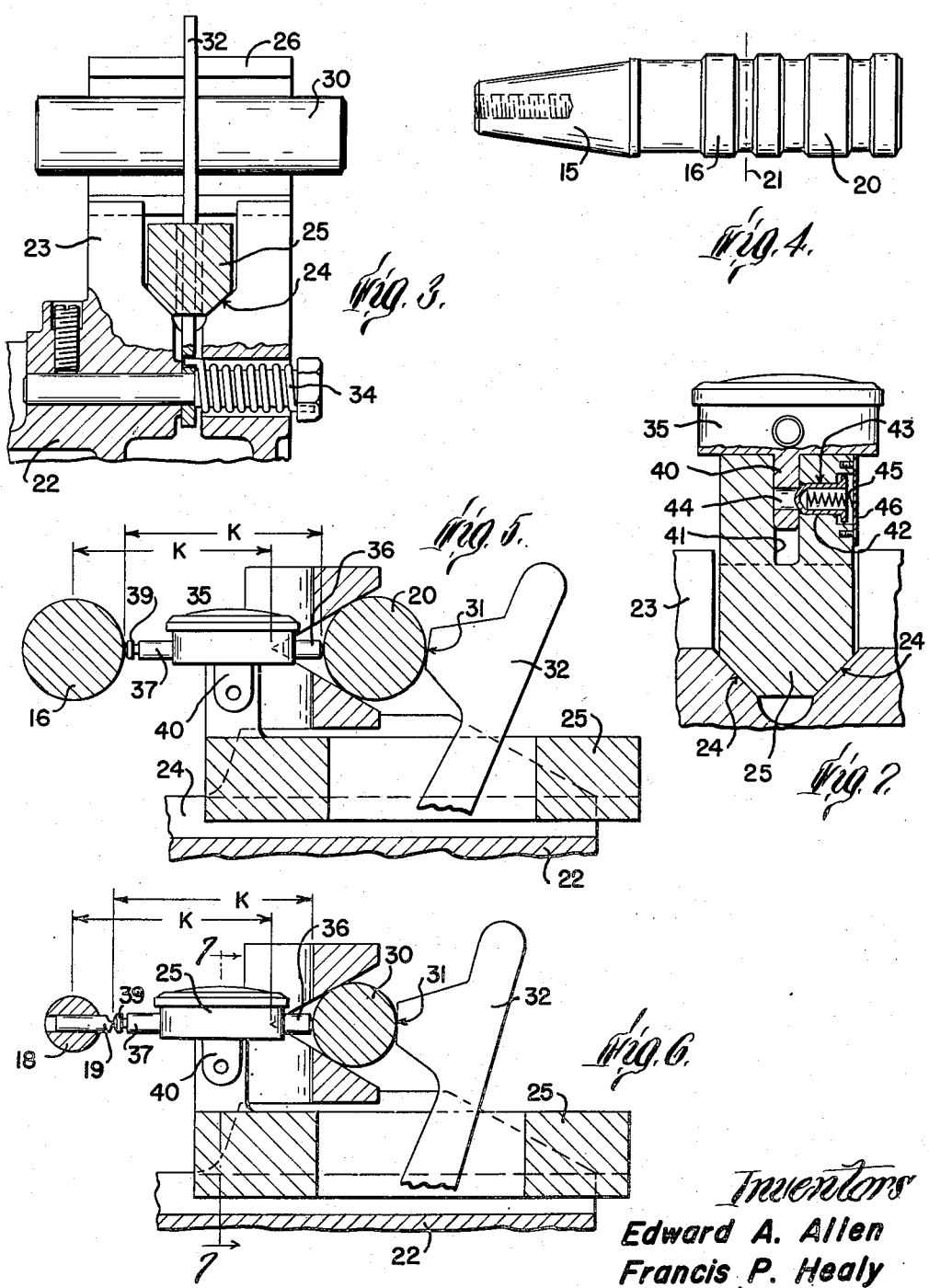

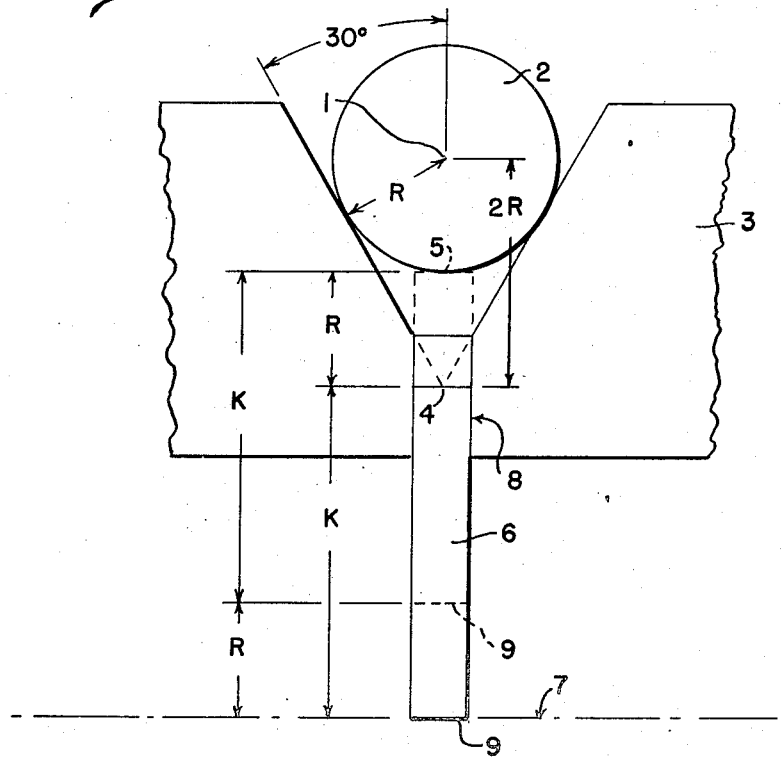

2,657,470

UNITED STATES PATENT OFFICE 2,657,470

PRESETTING DEVICE FOR BORING TOOLS

Edward A. Allen, Westfield, and Francis P. Healy, Springfield, Mass., assignors to Van Norman Company, Springfield, Mass., a corporation of Massachusetts Application June 15, 1950, Serial No. 168,264

4 Claims. (Cl. 33—185)

This invention relates to guage mechanism for pre-setting a boring tool to cut a bore of exactly predetermined diameter. In particular it relates to pre-setting mechanism by which a boring tool may be set to cut a hole having an exact and predetermined relationship to a piece which is to fit in the hole. The hole is not necessarily the same size as the piece it is to receive, but may be larger or smaller to obtain the type of fit desired. For convenience the mechanism will be described in connection with a machine for boring holes in pistons and connecting rods to receive wrist pins, although the invention is not limited to that use.

One object of the invention is to provide a gauge mechanism for pre-setting a boring tool in which no reliance is placed during the gauging operation upon contact with the surface of the boring bar itself, thereby avoiding a source of error in case the boring bar surface is not exactly true or correct in size. Another object is to provide a gauge mechanism in which the gauge contacts are not shifted from the wrist pin to the cutter bit, but in which one contact engages the wrist pin at the same time that another engages the bit. This eliminates errors which occurred in prior devices due to the use of two micrometers or to the shifting of a contact from one position to another. Additional objects and advantages will appear from the following specification and claims.

The invention will now be described with reference to the accompanying drawings, in which Fig. 1 is a plan of a boring machine showing in full lines the position of the gauging mechanism during the setting of a tool bit, and in broken lines the position of the gauging mechanism while being calibrated;

Fig. 2 is a side elevation of the gauging mechanism, taken on line 2—2 of Fig. 1;

Fig. 3 is a section on line 3—3 of Fig. 2;

Fig. 4 is a view of the calibrating and test cylinders before severance;

Fig. 5 is a section on line 5—5 of Fig. 1, illustrating the manner of calibrating the gauging mechanism;

Fig. 6 is a section on line 6—6 of Fig. 1, illustrating the manner of adjusting a tool bit;

Fig. 7 is an enlarged section on line 7—7 of Fig. 6; and

Fig. 8 is a diagram illustrating the principle on which the gauging mechanism operates.

The fundamental principle on which the presetting mechanism is based depends upon a novel use of the properties of a V block with an included angle of 60°, and is illustrated in the diagram of Fig. 8. Since the short side of a right angled triangle having a 30° angle is half the hypotenuse ($\sin 30° = \tfrac{1}{2}$) and the angle between a tangent and a radius drawn to the point of tangency is a right angle, it follows that the distance from the axis 1 of a cylinder 2 resting in a 60° V block 3 to the apex 4 of the angle of the latter must be equal to twice the radius R of the cylinder. A corollary is that the distance from the lowermost point 5 of the surface of the cylinder to the apex 4 must be equal to the radius R.

The latter relation is made use of in a novel way in the present invention. Let us assume that a rod 6 of any arbitrary length K exactly bridges the distance between the apex 4 and the axis 7 of a boring bar. It is clear from the figure that if the rod 6 were pushed up through a hole 8 in the V block until it struck the lower surface 5 of the cylinder 2, as shown in dotted lines, the distance between the lower end 9 of the rod and the boring bar axis 7 will be exactly the radius of the cylinder. A smaller cylinder will sit lower in the V block and thus bring the lower end of the rod closer to the boring bar axis, the distance from that axis being mathematically equal to the radius of the cylinder as before as long as the distance K from apex 4 to axis 7 is not changed. The distance K is wholly arbitrary, but once chosen it must be maintained for a given rod 6. If a cutter on the boring bar is set so as to make contact with the lower end of the rod while the upper end of the latter rests against the lowermost surface of the cylinder it will cut a hole exactly the size of the cylinder.

As it is usually desired to vary the size of the bored hole from that of the wrist pin to give the type of fit desired, the rod is in practice replaced by a gauge of the dial indicator type which can be set to zero reading as will be described below and thereafter by a deviation one way or another from zero will indicate the allowance for fit to which the cutter bit is being set. A boring bar spindle 10 is mounted in bearings in a housing 12, which is preferably stationary, the work being moved while the boring bar revolves only. At the free end of the spindle is a steep taper socket 13 within which a shank may be held by a draw-in bolt 14. This socket must be ground accurately while rotating in its own bearings. Two shanks are held alternatively in the socket in the present invention, a shank 15 (Fig. 4) carrying a calibrating cylinder 16 and a shank 17 (Fig. 1) carrying a boring bar 18 bearing adjustably a fly cutter or boring bit 19. The calibrating cylinder 16 is used only for calibrating the dial indicator so that it will read zero when a test cylinder 20 of exactly the same diameter as the calibrating cylinder is mounted in the V block. In other words, the dial indicator is set to zero with its ends separated by the standard although arbitrary distance K.

The calibrating and test cylinders 16 and 20 are preferably initially formed as a single piece together with the taper shank 15, and are ground accurately on centers to uniform diameter (Fig. 4). While still supported on the centers the taper shank 15 is also ground. The two cylinders are thereafter cut apart on the severance line 21. Since the exact diameter of the cylinders is of minor importance compared with the absolute equality of the diameters of the two cylinders (tolerance 0.0000") this method of preparing them is both simple and effective.

A preferred manner of mounting the V block and indicator on a boring machine will now be considered. The details of the boring machine are not of importance, since the present invention relates to the pre-setting gauge, and the machine itself will therefore be described only briefly. The boring bar 18 is mounted in the spindle as above, and a work-carrying table 22 is mounted as shown for movement parallel to the axis of the spindle. Spaced ribs 23 are formed on the table and provided with V-shaped ways 24 to support an indicator-carrying slide 25 suitably shaped to rest on the ways. A V block 26 is fitted accurately against shoulders 27 on the ribs and is secured by screws 28. This block has a 60° V as described previously into which a wrist pin 30 or the test cylinder 20 may fit. Whatever cylinder is in place is held by a flat face 31 of an arm 32 pivoted to the work table and urged towards the V-block by a torsion spring 34 (Fig. 3). The arm is preferably shaped so that if there is no cylinder in the block the arm will strike the end of the latter before the face 31 would strike the slanting surfaces of the V. The V block is always in a fixed position on the work table and thus its apex is at a constant distance from the axis of rotation of the boring bar. Care must be taken to have no play between the table and the ways on which it slides.

The dial indicator gauge 35 has, as usual, a fixed abutment 37, a movable abutment 36 passing through a hole in the V block, and a pointer 38. It also has an adjustment (varying with the make) for setting the pointer at zero for any given spacing of the abutments. This may be a rotatable dial, or a screw extension 39 on one of the abutments. A lug 40 on the rear of the indicator fits into a slot 41 in the slide 25. A detent 42 slides within a lateral hole 43 in the slide and is pressed towards a hole 44 in the lug 40 by a spring 45 bearing against a screw-fastened cover plate 46. By this means the indicator can be held in the machine for a gauging operation, and readily removed before the start of boring to avoid interference or damage. Besides being readily removed, the dial indicator may be turned end for end so that its movable abutment 36 will be in position to make contact with a cylinder held in the V block 26. In this position it has an additional utility in checking wrist pins or the like for concentricity or deviation from a standard diameter.

In operation the calibrating and test cylinders 16 and 20 are mounted respectively in the taper socket 13 and in the V block 26. The two cylinders are, as stated above, of exactly the same diameter. The dial indicator is placed in the slide 25 so as to be held by the detent 43, with its movable abutment 37 making contact with the cylinder 16 and the fixed abutment passing through a hole in the V block to make contact with the cylinder 20 (Fig. 5). The dial indicator is then adjusted to a zero reading by whatever adjusting mechanism is provided. From what has been said in connection with Fig. 8, it will be clear that both the distance from the spindle axis to the apex of the V block and the distance between adjacent surfaces of the two cylinders will be equal to the same constant K with great accuracy.

To adjust the fly cutter 19 the boring bar 18 is set in the taper socket and the wrist pin 30 to be fitted is located in the V block (Fig. 6). By using whatever adjusting means is provided for it, if the fly cutter is advanced or retracted until the dial indicator reads zero and then clamped there the hole bored will be a neutral fit for the wrist pin. By adjusting the fly cutter until the indicator varies from zero a predetermined amount the fit can be made as tight or loose as may be desired. It should be noted that when once calibrated the dial indicator need not be re-calibrated for every setting of the fly-cutter, although it is desirable to check the calibration occasionally to make sure that no adjustment has become misplaced. It should also be noted that once the indicator has been calibrated each setting of the fly-cutter is done by a single measurement rather than by two or more as in prior practice. With one abutment of the dial indicator against the wrist pin and the other against the cutter, any desired fit may be secured by adjusting the latter to give a selected reading of the pointer of the dial.

What we claim is:

1. A presetting device for rotating boring tools and the like comprising a V block having a sixty degree included angle and positioned with the line of its apex a predetermined distance from the axis of rotation of the boring tool, the block being provided with an opening extending therethrough at the V of the block, the V of the block being directed toward the axis of the tool, a slide movable at right angles to both said line and said axis, and a dial indicator having opposed measuring abutments mounted on said slide for movement therewith to bring one of its abutments, by way of said opening, against a cylinder supported in the V block at its side nearest the apex and with the other located at said predetermined distance from the first when the indicator reads zero.

2. A presetting device for rotating boring tools and the like comprising a V block having a sixty degree included angle and positioned with the line of its apex parallel to and at a predetermined distance from the axis of rotation of the boring tool, the block being provided with an opening extending therethrough at the V of the block, the V of the block being directed toward the axis of the tool, releasable means for holding a cylinder in the V block, a slide mounted for movement at right angles to both said line and said axis, and an adjustable dial indicator having opposed measuring abutments mounted on said slide for movement therewith to bring one of its abutments, by way of said opening, against the side of said cylinder nearest the apex, and with the other located at said predetermined distance from the first when the indicator reads zero.

3. A presetting device for adjustable boring cutter bits comprising a V block having a sixty degree included angle and a hole in its apex, means for mounting the V block at a fixed distance from the axis of rotation of the boring cutter with the apex of the V directed towards said axis and with the apical edge of the V parallel thereto, the distance between the apex of the V and the axis of rotation of the cutter being equal to the distance between the surface of a cylinder mounted in the V block and a cutter bit rotating about said axis at a radius therefrom equal to the radius of said cylinder, and a spacing device mounted radially with respect to the axis of rotation of the cutter passing through said hole, and bisecting the dihedral angle of the V, said spacing device differing in its length from said distance by the amount by which the hole to be bored is to differ from the diameter of said cylinder.

4. A presetting device for adjustable boring cutter bits comprising a V block having a sixty degree included angle, means for mounting the V block at a fixed distance from the axis of rotation of the boring cutter with the apex of the V directed towards said axis and with the apical edge of the V parallel thereto, the distance between the apex of the V and the axis of rotation of the cutter being equal to the distance between the surface of a cylinder mounted in the V block and a cutter bit rotating about said axis at a radius therefrom equal to the radius of said cylinder, and a spacing device mounted radially with respect to the axis of rotation of the cutter and bisecting the dihedral angle of the V, said spacing device differing in its length from said distance by the amount by which the hole to be bored is to differ from the diameter of said cylinder.

EDWARD A. ALLEN.
FRANCIS P. HEALY.

References Cited in the file of this patent

UNITED STATES PATENTS

| Number | Name | Date |
|---|---|---|
| 1,286,313 | Hertle | Dec. 3, 1918 |
| 1,794,162 | Flamm | Feb. 24, 1931 |
| 1,928,514 | Thorsen | Sept. 26, 1933 |
| 1,971,628 | Sutterlin | Aug. 28, 1934 |
| 2,000,476 | Schmidt | May 7, 1935 |
| 2,107,558 | Zimmerman | Feb. 8, 1938 |
| 2,375,448 | Talbot et al. | May 8, 1945 |

FOREIGN PATENTS

| Number | Country | Date |
|---|---|---|
| 6,055 | Great Britain | May 14, 1903 |
| 698,014 | France | Nov. 17, 1930 |

OTHER REFERENCES

Publ. American Machinist, p. 591, Apr. 9, 1931.